(12) United States Patent
McGuire et al.

(10) Patent No.: US 6,251,466 B1
(45) Date of Patent: *Jun. 26, 2001

(54) PARTICULATE NATURAL FRUIT PRODUCT AND METHOD OF MAKING SAME

(75) Inventors: Denis McGuire; Edward Richard De Haan; Robert Hodge Clark, all of Abbotsford (CA)

(73) Assignee: Brookside Foods, Ltd., Abbotsford (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/520,989

(22) Filed: Mar. 8, 2000

Related U.S. Application Data

(63) Continuation-in-part of application No. 09/441,922, filed on Nov. 17, 1999, now Pat. No. 6,123,016, which is a continuation-in-part of application No. 09/316,728, filed on May 21, 1999, now Pat. No. 6,113,968, which is a continuation of application No. 08/949,040, filed on Oct. 10, 1997, now abandoned, which is a continuation of application No. 08/912,247, filed on Aug. 15, 1997, now abandoned.

(60) Provisional application No. 60/024,097, filed on Aug. 16, 1996.

(51) Int. Cl.$^7$ ................... A23L 1/06; A23L 1/05
(52) U.S. Cl. .............. 426/577; 426/573; 426/616; 426/639; 426/640; 426/443; 426/471; 426/476; 426/519
(58) Field of Search ................ 426/577, 573, 426/616, 639, 640, 443, 471, 476, 519

(56) References Cited

U.S. PATENT DOCUMENTS

| | | |
|---|---|---|
| 3,647,478 | 3/1972 | Minor et al. . |
| 3,682,654 | 8/1972 | Johnson . |
| 3,737,328 | 6/1973 | Schumann . |
| 3,922,360 | 11/1975 | Sneath . |
| 3,994,215 | 11/1976 | Rabeler . |
| 4,117,172 | 9/1978 | Bradshaw et al. . |
| 4,126,704 | 11/1978 | McCarthy et al. . |
| 4,241,099 | 12/1980 | Tiemstra . |
| 4,251,547 | 2/1981 | Liggett . |

(List continued on next page.)

OTHER PUBLICATIONS

Richmond, Walter, "Choice Confections", pp. 308–319, Manufacturing Confectioner Publishing Company, Oak Park, Ill., 1954.

*Primary Examiner*—Nina Bhat
(74) *Attorney, Agent, or Firm*—Oyen Wiggs Green & Mutala

(57) ABSTRACT

The present invention relates to a novel method of making a non-liquid fruit product (fruit chip) which has a natural fruit flavor and which can be formed in desired individual or discrete configurations and sizes. A method of making a dry particulate natural fruit chip product comprising: (a) adding a fruit ingredient and water to a heated kettle; (b) adding buffer, sugar and pectin to the fruit ingredient and water; (c) boiling the buffer, sugar and pectin fruit ingredient and water mixture to hydrate the pectin; (d) adding liquid sugar to the mixture and continuing to boil the mixture until excess water is boiled away; (e) adding sugar to the mixture in the kettle to reduce the temperature of the mixture and increase solids concentration; (f) transporting the mixture from the kettle through a heat exchanger to raise the temperature of the mixture; (g) adding acid and flavoring mix to the mixture and mixing the acid/flavour into the mixture; (h) passing the mixture into a heated depositor and dispensing the mixture onto a surface in the form of discrete fruit chips; (i) retaining the fruit chips on the surface until they lose heat and form a stable gel; (j) transporting the gelled fruit chips through a zone to remove excess moisture and enhance gel strength of the fruit chips; and (k) transporting the fruit chips through a cooling zone so that the fruit chips lose further heat and reach ambient temperature.

34 Claims, 8 Drawing Sheets

U.S. PATENT DOCUMENTS

| | | |
|---|---|---|
| 4,341,803 | 7/1982 | Koshida et al. . |
| 4,566,376 | 1/1986 | Webb . |
| 4,713,252 | 12/1987 | Ismail . |
| 4,767,630 | 8/1988 | Silver et al. . |
| 4,853,245 | 8/1989 | Bouilette et al. . |
| 4,859,487 | 8/1989 | Matsumura et al. . |
| 5,084,296 | 1/1992 | Lugay et al. . |
| 5,190,785 | 3/1993 | Oelsner . |
| 5,417,990 | 5/1995 | Soedjak et al. . |
| 5,554,406 | 9/1996 | Muenz et al. . |

PARTICULATE NATURAL FRUIT PRODUCT AND METHOD OF MAKING SAME

This is a continuation-in-part of application Ser. No. 09/441,922, filed Nov. 17, 1999 now U.S. Pat. No. 6,123,016, which was a continuation-in-part of application Ser. No. 09/316,728, filed May 21, 1999 now U.S. Pat. No. 6,113,968, which was a continuation of application Ser. No. 08/949,040, filed Oct. 10, 1997, now abandoned, which was a continuation of application Ser. No. 08/912,247, filed Aug. 15, 1997, now abandoned, which was based on provisional application Ser. No. 60/024,097, filed Aug. 16, 1996.

FIELD OF THE INVENTION

The present invention relates to a novel method of making a non-liquid fruit product (fruit chip) which has a natural fruit flavor and which can be formed in desired individual or discrete configurations and sizes. More particularly, the present invention relates to dry particulate fruit product, namely a fruit chip product, where a substantial portion of the end fruit chip product is derived from the fruit per se. The fruit chip product has an attractive balance of qualities such as taste, texture, shelf life, and other characteristics, giving the semblance or character of fresh fruit. The fruit chip product by itself is a very tasty and healthy snack-like product, but it can also be incorporated advantageously in any number of other food products, such as energy bars, granola bars, baked products, cookies, snacks, confectionery cereals, and the like. The fruit chip product can contain nutrients, additional food ingredients, vitamins, pharmaceutical products and other ingestible substances.

BACKGROUND OF THE INVENTION

Various methods are disclosed in the prior patent art where natural fruit, singly or in combination, is used as an ingredient for a food product which has a fruit-like flavor, or fruit-like characteristics. A number of the prior art patents are listed and discussed below but the list should not be regarded as exhaustive.

U.S. Pat. No. 5,084,296, Lugay et al., discloses a method of making simulated fruit pieces to be combined in breakfast cereals. The moisture content in breakfast cereals is generally about two percent to three percent, and when a particulate fruit product is mixed into the breakfast cereal and stored for a period of time (four to eight weeks), the fruit's moisture level drops below ten percent, which makes the fruit hard and difficult to eat. The objective of the process in this patent is to make the fruit pieces so that the dry food product in the cereal/fruit mixture can have a moisture content as low as two percent, and yet the fruit pieces maintain softness. The fruit pieces have the following recipe:

| | |
|---|---|
| Citric acid | 0.3% to 1.0% |
| Sodium citrate | 0.1% to 0.4% |
| Glycerol | 15% to 30% |
| High fructose solids or other sweetening compositions such as crystalline fructose | 5% to 35% |

The above weights are given as percentage of the total fruit piece.

The solid portion is prepared separately from the liquid portion, and consists of the fruit solids and other optional ingredients, such as color, flavor, etc. The ratio of the fruit solids to liquid is approximately one to one, but could vary between 9.8 to 1 or 1.1 to 1.

The liquid portion is heated to temperatures of 60° to 100° C. and preferably 90° to 95°. Then the liquid and solid portions are mixed about one to four minutes. The mixture is then shaped, typically by running it through an extruder or a pasta machine to form it into ropes or strands. The rope is permitted to cool and then is cut into pieces. A suitable non-stick coating can be used.

U.S. Pat. No. 4,853,245, Bouillette et al., shows a method of making a food product which is in pieces or lumps of reconstructed fruit. Two different mixtures are placed in two storage tanks. In storage tank No. 1, there is basically a fruit concentrate, made up of a fruit puree, crystal sugar, an alcohol constituent (high percentage of alcohol), trisodic citrate and possibly citrate acid. The second tank contains sodium alginate, anhydrous dicalcic phosphate, crystal sugar and water. The mixtures from the two tanks are blended into a mixture and discharged into chunks or pieces which then harden to make the final product.

U.S. Pat. No. 4,117,172, Bradshaw et al., describes a process for forming a fruit product which has an interior fluid or plastic simulate core and a relatively hard exterior shell. Thus, this simulates natural fruit products such as gooseberries, grapes, cherries, or black currants. First, a fruit pulp or puree is provided, and this forms 25% or more by weight of the total mixture.

An alginate sol is prepared by mixture of sodium alginate (1.5 parts), sugar (8.5 parts) and water (40 parts). The sodium alginate and sugar are mixed dry and water is added.

Then a puree mix is prepared (in this case, a gooseberry puree) by providing:

| | |
|---|---|
| Gooseberry puree | 35 parts |
| Sugar | 10 parts |
| Coloring and flavoring agents | 0.5 parts |
| Water | 4.5 parts |

The alginate sol and gooseberry puree are mixed in equal proportions and then extruded into a trough containing a solution of the following:

| | |
|---|---|
| Calcium lactate penta-hydrate | 5 parts |
| Sugar (or the like) | 20 parts |
| Lactic acid | 1 part |
| Water | 74 parts |

The alginate sol and fruit mixture is extruded through apertures that open directly into the calcium lactate solution. On extrusion, a skin of calcium alginate is formed around each extruded piece. The pieces take a rounded shape similar to gooseberries, and are deposited on a conveyor belt which carries them through the trough. After ten minutes, the pieces are removed from the calcium lactic acid solution, and they have an exterior surface that is thick and strong enough to withstand piling into a container. The pieces are then put into an aqueous syrup. After standing for one half hour, the pieces are heated to 90° C. (steam kettle) in the aqueous syrup for a short period of time to prevent the core from becoming fin and are then canned while still hot.

U.S. Pat. No. 3,922,360, Sheath, discloses a process of making simulated soft center fruit pieces, rather similar to the Bradshaw et al. patent noted immediately above. Both of these patents are assigned to Lever Brothers Company of New York. In this patent, there is first provided a fruit pulp mix containing calcium iron. In the example given, this is as follows:

| Percentage by Weight | |
|---|---|
| Black Currant Pulp | 41.1 |
| Water | 42.8 |
| Calcium lactate | 1.1 |
| Citrate Acid | 0.2 |
| Sugar | 12.7 |
| Cross Linked Farina | 1.7 |
| Carboxymethyl cellulose | 0.5 |

As a separate ingredient, an alginate sol containing two percent by weight of sodium alginate is prepared.

The patent shows an apparatus for forming this product where fruit puree droplets 10 are discharged through a center tube 2. There is a surrounding chamber 7 at the outlet end of the tube 2, and this chamber contains alginate sol. A pneumatic pulsator is attached to a line 4 that communicates with the interior of the tube 2, and this causes drops of the fruit puree to drop off the end of the tube 2. Because of the surrounding alginate sol solution, a coating 11 surrounds the fruit puree droplet 12. Droplet 12 falls into a bath 10 which is a three percent by weight aqueous solution of calcium lactate. The drops 12 remain in this bath for about five minutes and a firm exterior is formed, and the stickiness of the outer surface is eliminated. It is stated that when this particular product is canned in an aqueous syrup and sterilized at 130° C. for 30 minutes, the simulated black currants that are formed have a texture remarkably similar to real cooked black currants.

U.S. Pat. No. 3,682,654, Johnson, relates to a process for forming artificial food pieces which simulate products having actual fruit therein. Johnson discloses that artificial berries containing a liquid center can be simply prepared by merely encompassing an aqueous solution containing flavoring and a gel setting agent capable of causing an aqueous solution of hydrophillic colloid to set up by such a hydrophillic colloid solution. Since the interior of the berry does not contain the material capable of being set up, the surface film or skin is formed from the inside out and the center or interior remains liquid. The invention provides unique artificial flavored berries which find use as additives to various foods including ice cream, cakes, pastries, muffins, pies, sauces, jams, candies and the like.

In practising the invention, two aqueous solutions are made. The first comprises water, flavoring and a gel setting agent capable of causing the hydrophillic colloid in the second solution to set up and form a skin around portions or droplets of the first solution. The second solution comprises water and a hydrophillic colloid capable of being set up by the gel setting agent.

The temperature of the water in the first solution is at about 1215° F., while the temperature of the water in the second solution is at about 200° F. Individual droplets of the first solution are dropped into the second solution and allowed to remain in the second solution for about one-half to two minutes. The resulting artificial flavored berry product is then removed from the second solution. The product has a continuous skin or encasement and a liquid center which remains as such for extended periods of storage.

U.S. Pat. No. 5,190,785, Oelsner, discloses a method for the manufacture of jams and marmalades. From the charged products of fruit, glucose syrup or crystallized sugar, a component of fruit and glucose syrup which is smaller in comparison with the total quantity of charged products, is removed and boiled down separately for concentration, while the remaining component of charged products from the larger percentage of fruit and sugar is mixed with powdered or aqueous pectin and, in dependence of the solubility of the pectins, the separately inspissated component is mixed with the remaining component of fruit and sugar and the mixture is heated under pressure or vacuum to from 95° C. to 110° C. and, subsequent to the addition of an acid at gelatinization temperature, the product is filled into jars or the like.

The prior art also discloses various systems for forming an extruded food product.

U.S. Pat. No. 4,251,547, Liggett, shows a means for forming a fishing bait from an alginate mix. The bait mix is exposed to a fluid that causes the alginate to form a skin on a droplet. In FIG. 4, the bait material is ejected by a pulsating pump so that ridges are formed as the material solidifies. If the pump does not pulse, a smooth sided product is formed.

U.S. Pat. No. 4,126,704, McCarthy et al., shows a means for ejecting a food product from a valve structure as shown in FIGS. 2 and 3, into a mold.

U.S. Pat. No. 3,737,328, Schumann, shows a system in which a confection is dropped from a holder 12, to a conveyor belt where it hardens. An oscillating wire structure on the bottom of the holder 12 forms the material into droplets.

U.S. Pat. No. 3,647,478, Minor et al., discloses a means to form pellets of ice cream by extruding the material onto a conveyor belt. Cutting wires 24 that oscillate cut the material being extruded into required lengths.

U.S. Pat. No. 4,241,099, Tiemstra, shows pectin containing gelled products wherein the gelling is delayed for an enhanced length of time. This is adequate to permit the deposition or filling of the formulation into molds or containers before gelling proceeds. The products and method by which they are prepared more efficiently use pectin in a delayed gelation process by allowing setting at the optimum gelling pH in order to prepare final products of a desired gel strength with minimal quantities of pectin. A delayed-action or time-release acidulant is used in the method and is incorporated into the formulations and products of this invention, such acidulants including anhydrides, esters, lactones, and combinations thereof.

SUMMARY OF INVENTION

The subject invention relates to a method of making a gelled non-liquid natural particulate food product which has a natural fruit flavor and a desirable balance of qualities of taste, texture, shelf life and other characteristics, thereby giving the product a semblance or character of fresh fruit. The method of the present invention enables this particulate product to be conveniently formed in a consistent shape and various sizes. One desirable application of the subject invention is to form this product into discrete objects in the form of "fruit chips" which can be eaten or can be incorporated advantageously in other food products, such as energy bars, granola bars, cookies, snack products, or possibly combined with other food products as a separate fruit chip product.

The invention is directed to a method of making a dry particulate natural fruit chip product comprising: (a) adding a fruit ingredient and water to a heated kettle; (b) adding buffer, sugar and pectin to the fruit ingredient and water; (c) boiling the buffer, sugar and pectin fruit ingredient and water mixture to hydrate the pectin; (d) adding liquid sugar to the mixture and continuing to boil the mixture until excess water is boiled away; (e) adding sugar to the mixture in the kettle to reduce the temperature of the mixture and increase solids concentration; (f) transporting the mixture from the kettle through a heat exchanger to raise the temperature of the mixture; (g) adding acid and flavoring mix to the mixture and mixing the acid/flavour into the mixture; (h) passing the mixture into a heated depositor and dispensing the mixture onto a surface in the form of discrete fruit chips; (i) retaining the fruit chips on the surface until they lose heat and form a stable gel; (j) transporting the gelled fruit chips through a zone to remove excess moisture and enhance gel strength of the fruit chips; and (k) transporting the fruit chips through a cooling zone so that the fruit chips lose further heat and reach ambient temperature.

The water content of the boiling mixture in step (d) can be reduced giving about 72 percent weight solids. The sugar added in step (c) can raise the solids content of the mixture to about 82 to 88 percent weight solids.

The temperature of the mixture in step (c) is raised to about 105° to 106° C. The temperature of the mixture in step (e) after the sugar is added can be between about 160° to 170° F. The temperature of the mixture in step (f) can reach about 195° to 200° C. The temperature at the end of step (i) can be about 120° F.

The mixture in step (h) can be dispensed as droplets onto the surface. The surface upon which the mixture is deposited in the form of discrete droplets can be a moving conveyor belt.

The buffer in step (b) can be sodium citrate. The sugar can be selected from one or more of the group consisting of sucrose, glucose, maltose and dextrose.

After the mixture is dispensed in the form of discrete droplets onto the surface according to step (h), the discrete droplets can be conveyed through a zone in which the temperature of the discrete droplets is at a temperature of about 125° F. The discrete droplets can be conveyed through the zone for about 10 minutes.

The discrete droplets after passing through the zone can be conveyed through a cooling zone in step (k) which can be maintained at a temperature of about 40° F. The discrete droplets can be conveyed through the cooling zone for about 20 to 45 minutes.

The percentage by weight of ingredients in the fruit mixture can be follows:

| | |
|---|---|
| fruit | 20 to 40 percent; |
| sugar (sucrose) | 35 to 50 percent; |
| glucose | 20 to 30 percent; |
| pectin | 1.2 to 2.0 percent wt.; |
| sodium citrate | 0.3 to 0.8 percent wt.; |
| natural flavor | 0.2 to 1.0 percent wt. |

The fruit ingredient can be selected from a group consisting of, but not limited to, blueberries, blackberries, strawberries, raspberries, oranges, lemons, limes, cherries, mangos, peaches, apricots, passion fruit, cranberries, apples, black currants, papayas, grapes and combinations thereof.

The fruit ingredient can be selected from a group consisting of fresh fruit, fruit puree, refrigerated fruit frozen fruit that has thawed, fruit concentrate, or dried fruit which has water added thereto to form the fruit ingredient, and combinations thereof. The fruit ingredient can be in a particulate, comminuted or concentrate form.

The buffer can be added to the fruit ingredient prior to adding the pectin, in order to delay gelling of the pectin. The pectin can be provided as a mixture of pectin and particulate sugar. The particulate sugar in step (e) can be sucrose. The ratio of sugar to pectin in the mixture of sucrose and pectin can be between 2 to 1 and 6 to 1.

The liquid sugar in step (d) can be glucose. At least a portion of the liquid sugar can be a lower molecular weight sugar so that the final product comprises both sucrose and the lower molecular weight sugar. The lower molecular weight sugar can comprise dextrose.

The percentage by weight of ingredients added in steps (a) and (d) can be as follows:

| | |
|---|---|
| fruit ingredient | 20% to 40% |
| sugar | 40% to 75%. |

A portion of the sugar can be sucrose and can be added in a percentage range by weight of 35 to 50%, and a portion of the sugar can be glucose which can be added to any percentage by weight of 20 to 30% of the total ingredients. Pectin can be added at a percentage of 1.2 percent to 2 percent of total weight of ingredients.

The surfaces of the fruit chips can be treated to prevent the fruit chips from adhering together. The surfaces of the fruit chips can be treated with powdered sugar. The fruit chips produced by steps (h) and (i) can be coated with powdered sugar before proceeding to step (j).

The fruit chips can be treated to embed the powdered sugar into the surfaces of the fruit chips. The fruit chips can be tumbled to cause the fruit chips to impact with one another and embed powdered sugar in the surfaces of the fruit chips.

BRIEF DESCRIPTION OF DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Introduction

The first step in producing fruit chips is the selection and initial processing of one or more naturally occurring fruit products to be used as an ingredient for the end fruit chip product. The fruit products that are used in the process of the invention can be either fresh, refrigerated, frozen, concentrated or dried. Fruit concentrates have been found to work well in the context of the invention and production of fruit chips.

Among the fruit products that are suitable for the subject invention are the following: blueberries, blackberries, strawberries, raspberries, oranges, lemons, limes, cherries, mangos, peaches, apricots, passion fruit, cranberries, apples, black currants, papayas and grapes. Other fruits can also be used.

In the event that a fruit with a thick skin, such as an orange, is used, it is preferable that the skin be removed and the remaining edible portion of the fruit be used. Also, if the fruit has a large pit, such as a peach, this can also be removed. However, with raspberries, where the seeds are rather small, the seeds may simply be included in the raspberry fruit product utilized in making the fruit chip food product of the present invention.

It is also possible to use dehydrated fruits as the starting fruit product. In that case, the dehydrated fruit is first reconstituted by having water combined therewith before the hydrated fruit product is incorporated in the process of the present invention.

In general, the starting fruit products are provided in the form of a puree, either with the seeds removed or with the seeds left in. Alternatively, the whole fruit or fruit pieces can be run through a blender or commutated in some other manner, or otherwise processed to be in a particulate form, as may be required.

A typical fruit product recipe that has been found suitable for producing tasty and appealing fruit chips according to the invention is set out below:

| Raspberry Fruit Chips | |
|---|---|
| Raspberry puree | 300 to 400 kg |
| Sodium citrate | 4 to 6 kg |
| Pectin | 15 to 22 kg |
| Sugar | 75 to 82 kg |
| Boil with mixing. | |
| Add glucose 42 O.E. | 280 to 340 kg |
| Cook to 105–106° C. | |
| Add sugar | 300 to 380 kg |
| Pump to heat exchanger. | |
| Add natural flavour | 2 to 5 kg |
| Citric/malic acid solution | 16 to 20 kg |

Batch/Semi-Continuous Embodiment of the Subject Invention

Figure 1:
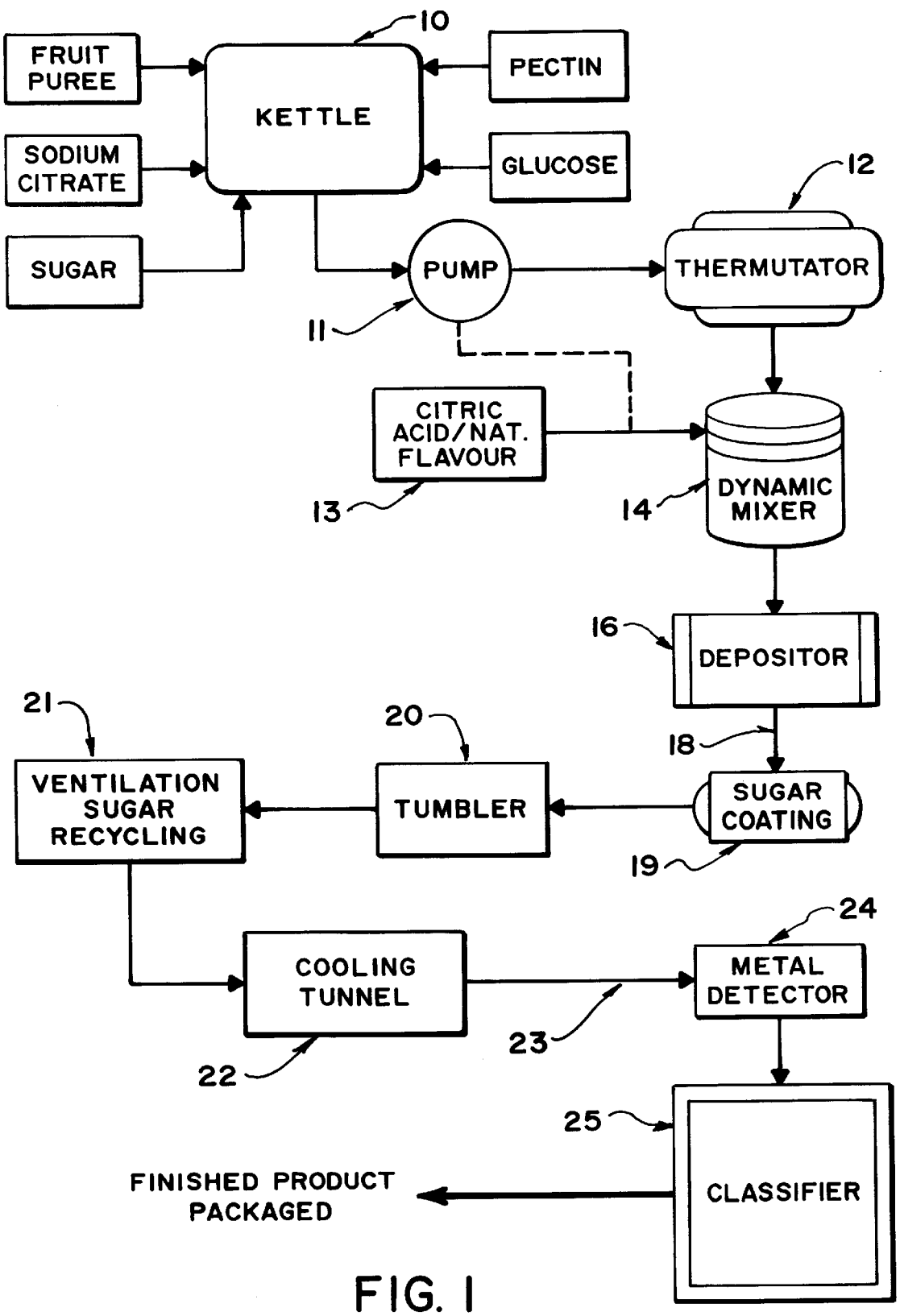
FIG. 1 is a schematic drawing of the various apparatus that are utilized in series in a batch process for making the fruit chip product of the present invention.

One embodiment of the present invention is a batch/semi-continuous process. This is illustrated schematically in FIG. 1, which shows in series the various apparatus that are used in processing fruit chips according to the invention. In general terms, the originating fruit product, as described above, and preferably a pureed fruit concentrate, and water, are first mixed and heated in a steam jacketed cooking kettle 10 having interior surface scraping mixing arms. A special pectin, a disaccharide, and sodium citrate buffer are then added to the mixing fruit product in the kettle and boiled. Liquid glucose is added to the boiling mixture which is then boiled at a specified temperature. Lastly, granulated sugar (sucrose) is added to partially cool the boiling fruit mixture.

More specifically, the fruit concentrate, water, buffer and sugar mixture introduced into the kettle 10 is brought to a rolling boil of about 105.6° C.±0.2° C. (222° F.+0.4° F.). The water in the mixture is gradually boiled off until the mixture reaches a specific Brix number (between about 70° and 76° Brix) which is about 70% to 76% weight solids. [The Brix number, which is an indicator of solids concentration in a solution, is measured by a refractometer. One type of refractometer is available from Bausch & Lamb.]

Additional granulated sugar is then added to the boiling mixture to increase the total solids to 82 to 88% weight, and reduce the temperature to about 165° F. to 170° F. (74° C. to 77° C.). Reduction in temperature is necessary to retard sugar inversion. Then this mixture either remains in the kettle 10 and is held in the kettle at a temperature level at 165° F. to 170° F. (74° C. to 77° C.), or is moved to a storage tank and held at that temperature.

The fluid fruit mixture in the kettle 10, or storage tank, is then pumped by pump 11 through a heating unit 12 (a Thermutator available from Cherry Burrell Int., Cedar Rapids, Mich.), which is designed to raise the temperature of small quantities of the fruit mixture very rapidly to about 190° F. to 205° F. (88° C. to 96° C.).

As the fluid fruit mixture is discharged from the heating unit 12, both citric acid and natural flavoring are added to the mixture in carefully metered proportions from a tank 13. The flavoring (as its name implies) adds additional flavoring to the mixture. The citric acid is added to lower the pH to provide ideal conditions for the special pectin to gel the fruit mixture.

After the citric acid and flavoring are added, the fluid fruit mixture is directed through a dynamic mixer 14, and is then directed to a dispensing apparatus 16 (called a depositor), which itself is maintained at a temperature of about 195° F. to 196° F. (90° C. to 91° C.). The construction of the depositor 16 is discussed in more detail below in association with FIGS. 3 to 8. In general terms, the depositor 16 has on its underside about 600 to 2,000 nozzles arranged in a series of grid patterns. The depositor 16 has a dispensing chamber, from which the fluid fruit mixture is deposited through the nozzles as discrete droplets onto a moving conveyor belt 18 to form fruit chips. The inherent stickiness of the fruit drops dispensed from the underside of the depositor 16 assists in pulling them from the nozzles onto the conveyor 18. After the fruit mixture is deposited onto the belt 18 in the form of fruit chips, and they travel a certain distance where they gel into a relatively stable configuration, the surfaces of the fruit chips are coated with a small amount of powdered sugar at station 19 by a sugar sprinkler (to be discussed in more detail later in association with FIGS. 9 and 12). A conveyor belt 26 carries the sugar coated fruit chips into a tumbler 20 and then subsequently the chips are transported through a cooling tunnel or chamber 22. Thus the fruit .chips are formed into a sugar coated particulate gelled fruit product.

Figure 13:
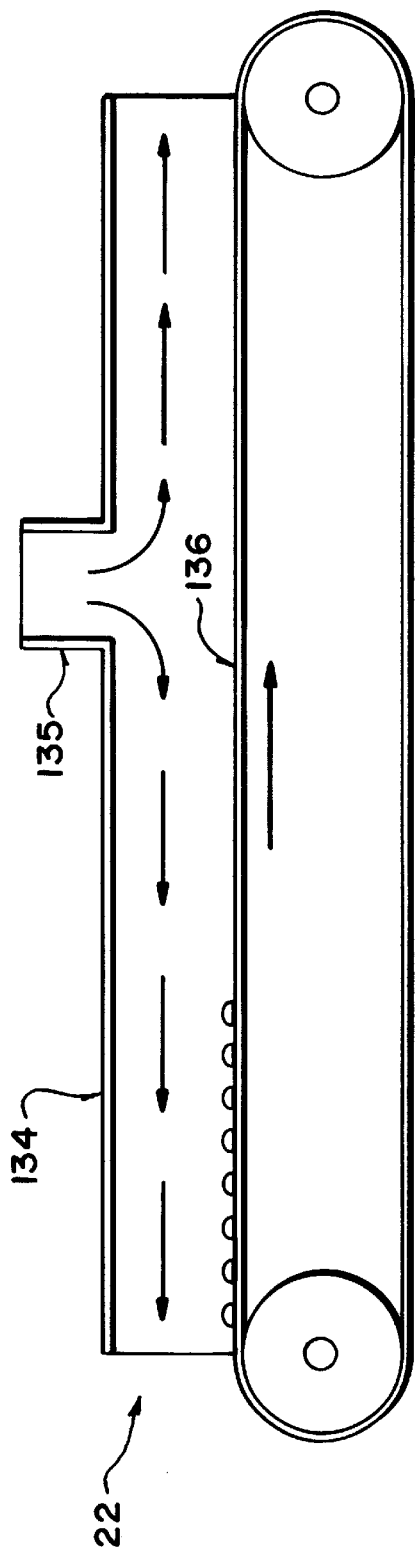
FIG. 13 illustrates a partial section elevation view of the fruit chip cooling chamber.

The cooling tunnel or chamber 22 has a conveyor belt 136 therein (see FIG. 13). The air in the cooling tunnel 22 is maintained at about 40° F. (5° C.) by a refrigeration system. The fruit chips cool from about 70° F. to 75° F. (21° C. to 24° C.) to about 55° F. to 60° F. (13° C. to 16° C.) after passing through the tunnel 22 from beginning to end. After the cooled fruit chips exit the tunnel 22, they are conveyed on a conveyor 23 to a classifier 25 (see also FIG. 14). The conveyor 23 has a metal detector 24 to detect and remove any metal particles that might inadvertently have entered the process and contaminate the fruit chips. The classifier 25 vibrates and has therein three stacked screens, the top screen is 0.5 in. mesh and collects unwanted occasional large fruit pieces. The underlying middle screen is 5/16 in. mesh and collects the desirable fruit chips for packaging. The process is so finely timed and sophisticated that virtually all of the fruit chips produced are suitable for use by the consumer and are collected on the middle screen. The bottom screen is 20 in. mesh and permits small pieces and excess sugar to be eliminated from the process. Surplus powdered sugar that enters the atmosphere is collected at a ventilation-sugar recycling station 21 and is recycled to the sugar coating 19 station. Filter bags are used in the ventilation station 21 to filter out the sugar. Sugar collected by the filter bags is also recycled. Sugar is valuable and every opportunity is made not to waste the sugar.

With the overall batch semi-continuous process being described above in general terms, there is now presented a further discussion of the details of the various steps in this fruit chip making process.

Batch Process

A typical formulation of the ingredients which are introduced into the fruit mixture to make the end product is as follows:

| Ingredients Added | Range Percentage | Ingredients (by Weight) | Percentage Medium |
|---|---|---|---|
| Fruit | 20–40 | 350 kg | 35 |
| Sugar (sucrose) | 35–50 | 380 kg | 42 |
| Glucose | 20–30 | 210 kg | 21 |
| Pectin | 1.2–2.0 | 16 kg | 1.5 |
| Sodium Citrate | 0.3–0.8 | 3 kg | 0.3 |
| Natural Flavor | 0.2–1.0 | 2 kg | 0.2 |

In describing this first embodiment, to place the apparatus and process of the invention in a practical framework, the production of a single batch of the fruit product will be discussed. The final fruit product produced by the batch totals about 1,000 kg, and the fruit product used is a raspberry puree. The total starting weight of the ingredients is about 1200 kg, but with about 200 kg of the water being boiled off, the end product weighs about 1,000 kg. It generally takes about two hours for the depositor 16 to dispense 1,000 kg of fruit product, so the last dispensed fruit mixture must be held in the kettle for about two hours.

The cooking kettle 10 which is used has a total liquid volume equal to that which would hold about 1500 kg of water. This kettle 10 may be a commercial steam jacketed kettle such as one made by Groen. The kettle 10 has a variable speed mixer, and mixing elements continually scrape the sides of the kettle 10 to prevent build-up of fruit product. The kettle 10 also has baffles to contribute to the mixing action. Steam is passed through the jacket of the kettle 10 and the kettle is thus capable of boiling the fruit and other ingredients contained therein. In the cooking process, the fruit ingredients, as described above, have about 80 to 94 percent water content when first placed in the kettle 10.

In this specific description of the first embodiment of the process, 360 kg of raspberry puree are placed in the kettle 10. Most often the fruit ingredient will be mildly acidic, so before the special pectin is added to the fruit ingredient in the kettle 10, a buffer is added to the fruit ingredient to raise the pH and delay the gelling action of the special pectin. A preferred buffer is sodium citrate. However, other buffers can be used, such as sodium lactate, potassium phosphate, calcium tartrate, calcium citrate, and the like. The preferred pH is greater than 3.8 to discourage setting.

After the buffer is added to the fruit mixture and mixed therein, the special pectin is added. In this particular embodiment where 360 kg of the fruit puree (specifically raspberry puree) are placed in the kettle 10, the appropriate amount of pectin is approximately 24 kg. The preferred method of adding the special pectin to the fruit ingredient is to first mix the pectin, which is in powder form, with sucrose which is part of the total sugar ingredient, and then add the mixture of sucrose and pectin to the fruit ingredient and water in the kettle 10 and mix it in. The sucrose enhances the ability of the pectin to disperse throughout the fruit ingredient and water. It has been found that mixing the sucrose with the pectin in about a 4 to 1 ratio (in this instance 80 kg of sucrose to 20 kg of pectin) is suitable.

The special pectin used in the process is a high methoxy pectin. However, within the broader scope of the subject invention, other types of pectin can be used, so long as they perform well in the process.

A ratio of 4 to 1 of water to total solids is a preferred ratio. However, a water to total solids ratio of 3 to 1 has been found to work satisfactorily. In this particular discussion, where 360 kg of the liquid fruit ingredient is used, and with the fruit ingredient being about nine parts water to one part solids, there are about 36 kg of fruit sugar and fibre and about 324 kg of water in the mixture. Then, when 100 kg of the sucrose/pectin mix are added, that provides about 80 kg of sucrose, 20 kg of pectin and 36 kg of fruit sugar and fibre which make up 132 kg of total solids content.

At this point in the discussion, it should be noted that the sucrose which has initially been added as part of the sucrose/pectin mix is only a portion (i.e. about 25 percent) of the entire quantity of disaccharide sugar which is to be added, and the rest of the disaccharide sugar, namely sucrose (about 75 percent) is added at a later time.

Once the special pectin has been dispersed throughout the fruit ingredient and water in the kettle 10, and the kettle 10 has been heated by the steam in the jacket surrounding the kettle 10, the temperature of the fruit ingredient (with the pectin and the sucrose dispersed therein) begins to rise. The mixture in the kettle 10 is brought to the boiling point of water (100° C.) and at this temperature, the pectin begins to hydrate.

As indicated previously, for the special pectin to properly disperse and hydrate in the fruit sugar mixture, it is necessary for there to be a reasonably high percentage of water. At this point, with the pectin dispersed and hydrated, it is possible to add other solids and liquids to the mixture. A monosaccharide liquid glucose is then added. The liquid glucose is added after the mixture has reached the boiling point so that the total solids content of the mixture is not at such a high percentage so as to impede the hydration of the pectin.

The liquid glucose contains some dextrose and it can also contain other ingredients such as maltose and dextrin. Various types of liquid glucose can be used so long as they perform in the process. The composition of the glucose is commonly varied by changing the percentage of the dextrose. The glucose is in a liquid form and is added to the mixture at the time (or shortly after the time) the fruit water and pectin mixture reaches the boiling point. The liquid glucose (along with the sucrose which was initially added with the pectin) is, and must be, of a sufficient quantity to prevent the fruit ingredient and sugar from burning during the cooking (boiling) stage. During the boiling stage, water evaporates from the mixture. During this time, the pH is held above 3.8 so that the mixture remains fluid and the pectin does not cause the mixture to gel to the point where the mixture sets up. Gelling of the fruit mixture occurs at a latter stage of the process after the liquid fruit mixture is deposited on the conveyor 18 by depositor 16.

Once the glucose has been added, the fruit, pectin, sugar and water mixture is boiled to a temperature of about 105.6° C., plus or minus 0.2° C. (222° F. ±0.4° F.), and the content of the boiling mixture is brought up to about 75 percent dissolved solids at this time/temperature. As the water boils off and the solids content increases, the boiling point increases proportionally toward the end of the cooking cycle.

At this point, after a solids content of about 75 percent is reached, the remaining part of the granulated sucrose (about 75 percent of the total) is added. In this specific example, about 440 kg of granulated sucrose are added. This raises the solids content of the mixture to about 82 percent. The addition of the granulated sucrose also reduces the temperature to about 165° F. to 170° F. (74° C. to 77° C.).

It has been found that it is advantageous to use two types of sugar to ensure that the process produces a reliable and acceptable fruit chip. The liquid sucrose (a monosaccharide sugar) has a lower molecular weight and resists crystallization. Sucrose, a higher molecular weight disaccharide, is a granulated crystal solid.

It is desirable to have a reasonably high percentage of sucrose as the sugar ingredient in the end product, since it better reacts with the pectin and enables the product to "set up". However, if the only sugar present at 80 percent solids is sucrose, it has been found that the sucrose will tend to crystallize out of the finished product. Using liquid glucose as part of the sugar system keeps the initial sucrose from crystallizing out. It has been found that a desired ratio of sugar should be about 65 percent sucrose and about 35 percent glucose, but this can vary between a one to one ratio to a three to one ratio.

It has also been found that if the high molecular weight sucrose remains at an elevated temperature for too long a period of time, it will break down into other non-setting sugar components. Thus its ability to enable the end fruit product to properly set (gel) is lost. The amount of sucrose which is initially added to the mixture by being mixed with the pectin should be small because it is subjected to prolonged boiling and breaks down substantially into the other components. Thus, by delaying the addition of the greater part of the sucrose until the end of the boiling period, the temperature of the boiling fruit/sugar/pectin mixture is reduced almost immediately and drops to a sufficiently low level, about 170° F. (77° C.), such that the sucrose does not break down quickly.

The next step is to direct the fruit/sugar/pectin mixture from the kettle 10 or storage tank through the heating unit 12, dynamic mixer 14 and depositor 16.

Since a single batch of this mixture may weigh as much as 1,000 kg, it can take about two hours for this quantity of mixture to move through the heating unit 12. Thus the last pumped portion of the mixture will remain in the kettle 10 or the tank for about two hours. Since the temperature is only 165° F. to 1700, however, the mixture is not cooking, and there is no significant change in quality or character.

When the mixture from the kettle 10, or the storage tank, is pumped via pump 11 through the Thermutator heating unit 12, the temperature of the mixture is again raised very quickly to about 195° F. or 197° F. (91° C. or 92° C.). We have found that the heater 12 can be of a type which is called a "Thermutator". The "Thermutator" is manufactured by Cherry Burrell, International, Cedar Rapids, Mich., and uses steam as the heat transfer medium. The function of the Thermutator 12 is to cause very rapid heat transfer so as to bring all of the fluid fruit material passed through the Thermutator to a high temperature very quickly.

The Thermutator 12 does this by distributing the fluid fruit material in very thin layers so that the heat from the steam can move into the mixture very rapidly. The fruit material on the heating surfaces of the Thermutator is constantly being scraped away. In one form, the fluid fruit material is passed through a cylindrical pipe, and scrapers continually scrape the material off the interior of the pipe.

As the mixture is leaving the Thermutator 12, citric acid and the additional flavoring are added from acid flavoring tank 13. After this, the mixture is immediately directed into the dynamic mixer 14. In the mixer 14, the temperature is maintained at about 195° F. (90° C.) so that the pectin does not start to gel. The fluid fruit mixture leaving the mixer 14 is then directed into the dispensing apparatus 16 (depositor). As indicated previously, the dispensing apparatus 16 is encased and maintained at a temperature of about 195° F. (90° C.).

After a quantity of the fluid fruit mixture has been raised up to about 195° F. in the heater 12, the timing in which the mixture must be formed into the shape of the fin product (fruit chips) and cooled is critical. The conditions which make sucrose break down are time, temperature, and acid content. Therefore, with the additional sucrose (and with this sucrose desirably remaining in the form of sucrose), the fruit mixture with the added sucrose must not be permitted to stay at a high temperature, with pH reducing acid in the mixture, for a long period of time.

The temperature and the timing of forming the fruit product into its final form as fruit chips subsequent to the adding of the citric acid is also critical. When the citric acid is added to the mixture, the mixture is at a temperature of at least 190° F. (88° C.), and it is maintained at that temperature in the dispensing apparatus 16 (depositor) until the mixture is actually deposited onto the conveyor belt 18 as droplets, or otherwise placed in its final form.

In this specific process embodiment, as described herein, when the droplets of the fruit mixture are discharged from the dispenser 16 and deposited on the moving conveyor belt 18, the droplets form into individual fruit chips. They are flat on the bottom, adjacent the conveyor surface, and have a rounded, symmetrical dome shape that is somewhat flattened on the top. These deposited droplets (fruit chips) gel rather quickly into a cohesive relatively stable fruit chip as they travel on the conveyor 18. After a very short period of time (two to four minutes) after the droplets have been deposited on the belt 18, in the form of fruit chips, and travel to the end of the belt 18, the fruit chips are coated with powdered sugar by a sprinkler. The sugar coated fruit chips are then directed into a tumbler 20 where the temperature is maintained at about 125° F. (52° C.). The tumbler 20 is slanted somewhat from its inlet to its outlet and the fruit chips travel through this tumbler 20 for about forty minutes.

The tumbler 20 rotates slowly and tumbles the powder sugar coated fruit chips as they travel along the interior of the tumbler. This action assists in embedding the powdered sugar into the surface areas of the individual fruit chips.

The chips then leave the outlet end of the tumbler 20 and are deposited onto a conveyor and carried for about 20 to 30 minutes through a cooling tunnel 22 in which the temperature is held at about 40° F. (4° C.). Then the fruit chips are conveyed to a classifier 25 and the desirable fruit chips are segregated and packaged for the commercial market.

It has been surprisingly found that by maintaining the particulate fruit product at a somewhat higher temperature (i.e. 125° F. or 52° C.) in the tumbler 20 for a period of time after the fruit droplets are dispensed from the depositor 16, the quality of the fruit chip product is enhanced. It is believed that this somewhat elevated temperature permits the molecules within the fruit chips to remain mobile for a certain period of time and thus enable the pectin to properly permeate through the molecular fruit and sugar structure and bind with the water to a greater degree. The elevated temperature also causes the overall structure of the end product to be more stable and cohesive.

The end gelled fruit product, in the form of individual fruit chips, is readily handled and packaged and remains fresh and stable for a long period of time. The sugar coated fruit chips, when packaged together, do not stick together. The taste and texture of the fruit chips is such that they have a desirable fruit flavor and contain sufficient remained moisture to remain soft and chewy for a long time. They make an overall tasty delectable product, when eaten directly, or used in other food products.

Continuous Process

The second continuous process of the invention will now be described with reference to FIG. 2, which shows the fruit mixture mixing and boiling process schematically. This is a continuous process which can be accomplished with continuous cooking, rather than batch cooking. The kettle is replaced by an elongated tube, which has therein a screw conveyor which moves the fluid fruit material through the cooking tube. The tube can be a double tube which has an outer annular chamber having a heating medium therein. The fluid fruit material is cooked and passed through the inner tube. Alternatively, this tube can be a triple concentric tube where there is an outer annular chamber and an innermost chamber, both of which have a heat exchange medium therein, and the fruit material passes through the middle annular chamber. The screw conveyor is designed to wipe both the inner and outer walls of the inner annular chamber.

There are several ports along the length of the cooking tube 22 through which the other ingredients can be injected at stages. Also, there are exit ports for evacuation of moisture from the fruit mixture.

Figure 2:
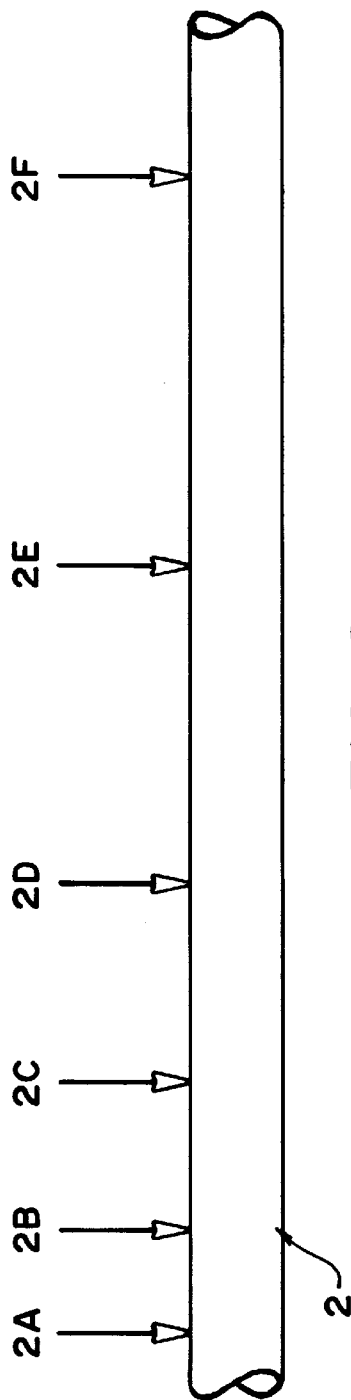
FIG. 2 is a schematic drawing illustrating a continuous process for making a fruit chip food product of the present invention.

As shown in the drawings in FIG. 2, the elongate cooking tube 2 has six inlet ports designated 2a through 2f. The fruit ingredient is introduced into the continuous cooker 2 at the inlet location 2a, and a short distance downstream, at location 26, the buffer (sodium citrate) is introduced. A further short distance downstream, the pectin (mixed with powdered sucrose) is introduced through port 2c.

From port 2c to port 2d, there is a distance which is sufficient to enable the temperature of the fluid fruit mixture to be brought up to the boiling point so that the pectin is properly hydrated in the fruit mixture. The glucose is then introduced at location 2d. There is sufficient distance between the inlet ports 2d and 2e to enable sufficient heat transfer to take place so that the water content of the fruit mixture is reduced to the desired level by boiling away the water.

When this heating and boiling process has been substantially completed, the remainder of the sucrose is introduced through inlet port 2e. This lowers the temperature of the mixture. The distance from port 2e to inlet port 2f is sufficient to enable the mixture to be brought up to the desired temperature (e.g. 190° F. to 195° F.) (88° C. to 90° C.). The citric acid plus flavor (as needed) is introduced into the mixture at inlet port 2f. Shortly after this, the mixture is drawn from the outlet end of the cooking tube 2 and delivered to the dispensing apparatus (depositor) 16.

The entire process time (the time for which a portion of the fruit ingredient is introduced into the inlet end until it is discharged to the dispensing apparatus) can take a total of about one and one half minutes. Accordingly, certain modifications must be made in this continuous process which are different from the steps that are followed in the batch process. For example, since the boiling off of the water can occur in a rather short time, it is possible to add the sucrose at the same location where the glucose is added (the inlet port 2d). Since the cooking time is relatively short, the sucrose does not break down to any great extent.

The ingredients can be preheated before being directed into the continuous cooker 2, or can be heated as quickly as possible after being directed into the continuous cooker. As indicated above, with regard to the adding of the sucrose (or similar sugar with a high melting point), depending upon how quickly the cooking is accomplished, the sucrose can be added at a more upstream location.

Apparatus

Figure 4:
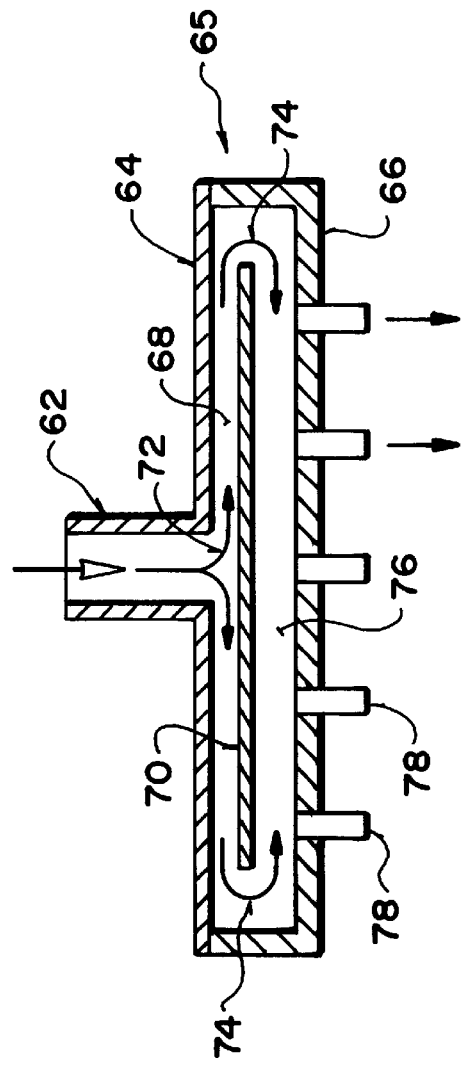
FIG. 4 is a sectional view of a droplet discharge member of the fruit chip dispensing apparatus shown in FIG. 3.
Figure 3:
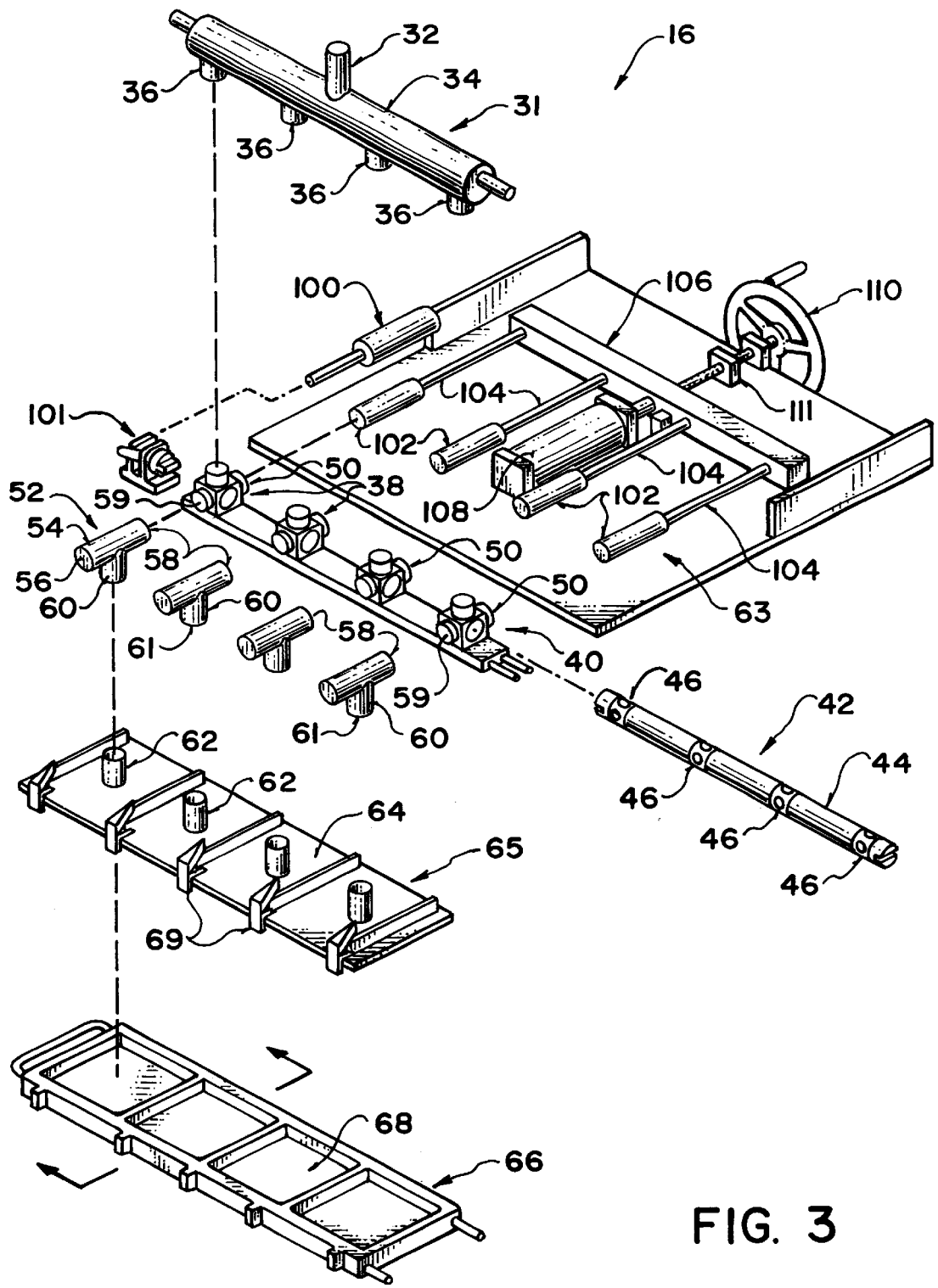
FIG. 3 is an exploded isometric view of a fruit chip dispensing apparatus of the present invention.

The apparatus that is suitable for carrying out the process is illustrated in FIGS. 2 to 4. As indicated earlier in this description, after the citric acid is added to the mixture, it is necessary to maintain the mixture at a high temperature 190° F. to 195° F. (88° C. to 90° C.) to delay the gelling action of the pectin. Therefore, the fruit mixture moves through the dispensing apparatus (depositor) 16 quickly so that the dwell time (the entire time that any portion of the mix remains in the dispensing apparatus) is suitably short. The flow of the fruit mixture through the depositor 16 must also be sufficiently uniform that none of the fruit mixture "stagnates" within the dispensing apparatus 16 (i.e. does not end up in a "dead spot" where it is out of the flow through the dispenser and gels). There are also some other requirements. For example, since the fruit mixture is usually dispensed as droplets on a high production basis, quality control is an issue. This includes obtaining uniform size and configuration of the droplets that are dispensed. Also, it is desirable that the droplets be deposited on the belt 18 in a manner that the fruit chips 17 that are formed have a consistent substantially uniform rounded surface on the upper side, and a flat surface on the bottom.

The dispensing apparatus of the subject invention will now be described with reference to FIGS. 3 through 8A–C, which illustrate various views of the depositor 16.

With reference to FIG. 3, the dispensing apparatus 16 comprises an elongated tubular manifold 31 which has a top inlet conduit 32 and a lateral dispensing manifold tube 34. There are four manifold outlets 36 positioned at evenly spaced locations along the underside of the manifold tube 34.

The four bottom outlets 36 connect respectively to four related two way valve housings 38 which are part of an overall valve assembly 40. A common elongated cylindrical valve element 42 is constructed of a rod 44 and four spaced valve spool components 46. These are positioned along the rod 42 so that they are located underneath a related valve housing 38. Each valve spool component 46 has passageways therethrough which will be described in more detail later. The four bottom manifold outlets 36 each connect respectively to a related upper inlet conduit 50 in each of the valve housings 38.

The depositor 16 includes four hollow T shaped transfer tube elements 52. Each "T" comprises an upper horizontal tube portion 54 having one end capped at 56. The opposite open end 58 of the tube portion 54 is connected to an outlet opening 59 of a respective related valve housing 38. The flow of fruit material through the depositor 16 is first through the top inlet 32 into manifold 31 and manifold tube 34. The fruit material then passes down through the bottom outlets 36 into the top inlets 50 of the several valve housings 38. The fruit material then passes from the top inlets 50 through the respective valve spools 46 inside valve housings 38 and out through openings 59 into the related inlet openings 58 of the T shaped member 52. The fruit material then passes through the bottom vertical leg 60 of the T shaped member 52 out of bottom openings 61 at the bottom end of the leg 60 of the T element 52, and into a related hollow inlet stub 62 on the top of dispensing plate assembly 65.

The flow of fruit material from the manifold 31 and through the valve assembly 40 is an intermittent flow which is controlled by a piston assembly 63, which will be described later in detail.

The fruit material flowing out of each lower leg opening 61 of the T elements 52 feeds into a respective inlet stub 62 positioned on a top cover 64 of a droplet forming and dispensing plate assembly 65. The plate assembly 65 further comprises a lower plate-like member 66, which together with the cover 64 forms four separate discharge chambers 68, each of which has a square configuration and is about 8 to 10 inches along each side. A number of clamping elements 69 hold the top cover 64 in firm engagement with the lower dispensing plate 66. The clamping elements can be opened to permit the top cover 64 and dispensing plate 66 to be separated for cleaning and maintenance.

FIG. 3 also illustrates the piston assembly 63 which causes the intermittent droplet discharge of the fluid fruit mixture. This piston assembly 63 comprises a master drive piston 100 and four cylinders 102, each containing a respective piston 112 (now shown) and connected to one of four rods 104 that are in turn mounted to and controlled by a common lateral actuating bar 106. The bar 106 is driven by an actuating cylinder 108 which moves the bar 106 back and forth. There is an adjusting wheel 110 which moves a stop member 111 to limit the stroke of the actuating cylinder 108.

Figure 5:
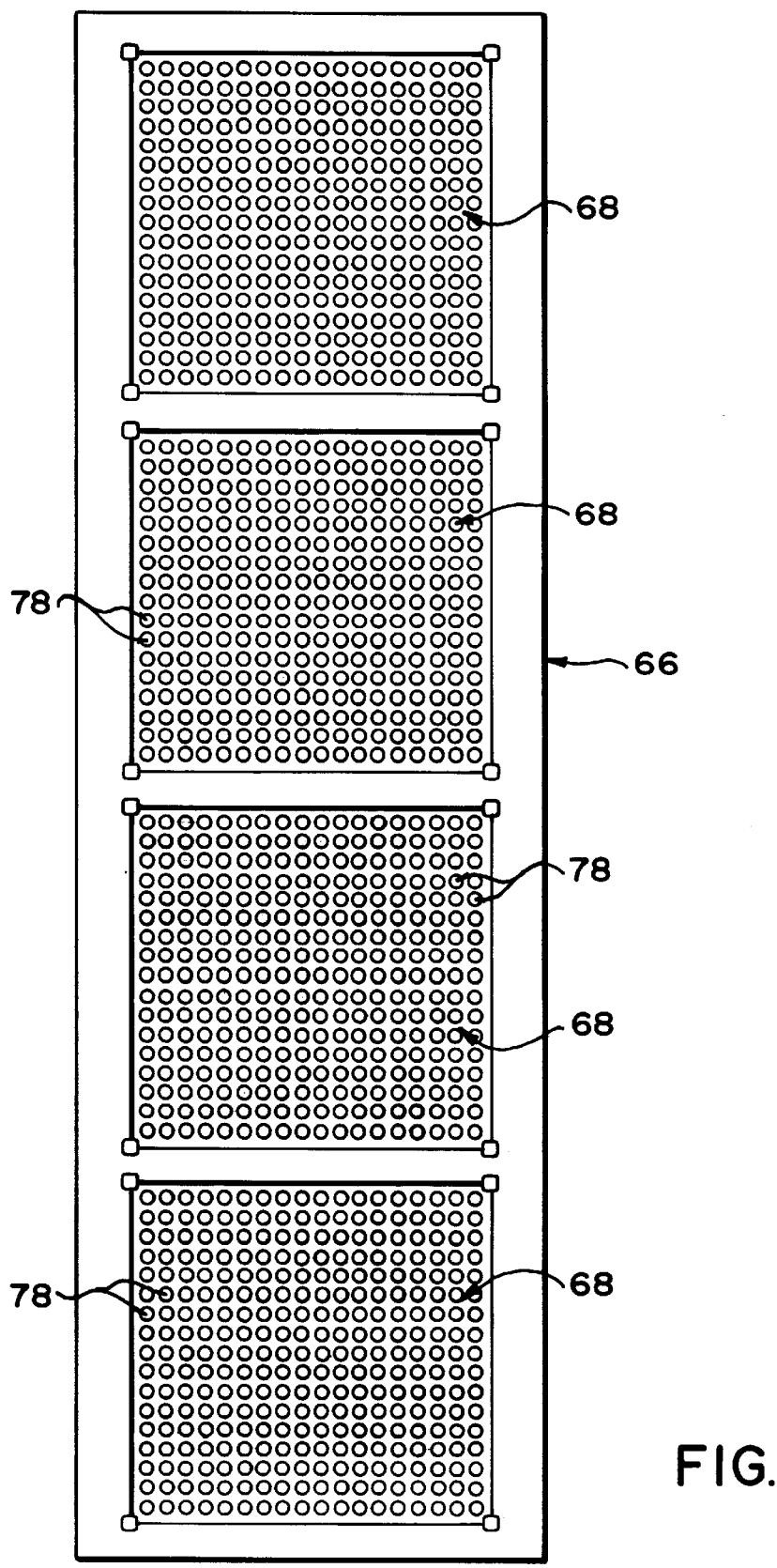
FIG. 5 is a top plan view of the bottom part of the fruit chip droplet dispensing member shown in FIG. 3.

FIG. 4 illustrates a cross-sectional side view of one of the chambers 68 formed by cover 64 and lower dispensing plate 66. FIG. 5 is a top plan view of the dispensing plate member 66, showing all four chambers 68 and discharge nozzles 78 arranged in four respective grid patterns. Each of these chambers 68 has an internal horizontal deflection plate 70 located moderately above the mid-height of its chamber 68. The flow of the fluid fruit mixture, as indicated by the arrows, is downwardly through the four hollow stubs 62 into the top part of its related chamber 68, where it is deflected by the deflection plate 70 to flow radially outwardly from the stub 62 as indicated by the arrows 72, and thence around all of the perimeter edges of the plate 70 (indicated by the arrows 74) and then to flow radially inwardly on the underside by plate 70 into a lower dispensing area 76 of the related chamber 68 (which is adjustable to have some openings to allow some fruit product to pass through holes and some to be deflected).

On the underside of plate assembly 66, there is a gridwork of downwardly projecting discharge nozzles 78 positioned at evenly spaced intervals across the bottom side of droplet discharge plate 66. (For convenience of illustration, only a few of the discharge nozzles 78 are shown schematically in FIG. 4. A more realistic grid-like arrangement is shown in FIG. 5.)

Figure 6:
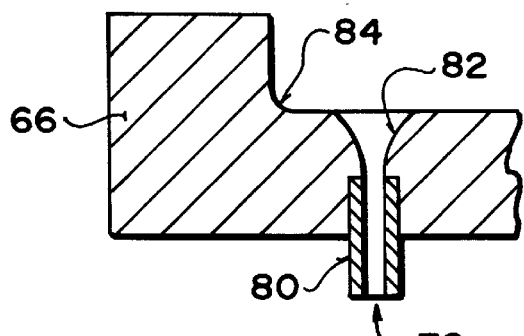
FIG. 6 is a sectional view showing the inlet tube of the fruit chip dispensing apparatus.

In FIG. 6, there is shown a detailed cross-section of one of the discharge nozzles 78 and a perimeter portion of the dispensing plate 66. It can be seen that the nozzle 78 comprises a dispensing tube 80 which fits within a downwardly tapered opening 82 in lower plate 66. The entry way 82 into the tube 80 is funnel shaped to provide a downward converging passageway for the fluid fruit material. This discourages the development of "dead spots" and encourages consistent droplet formation. Also, the inside corner perimeter edge portions 84 of the dispensing plate 66 are rounded so that there is a more uniform flow of the fluid fruit mixture, without the formation of dead spots. The other interior edges and corners of the entire dispensing assembly 65 are similarly rounded. This overall construction ensures that there is uniform flow of the fluid fruit material at all times so that no portion of the fruit mixture lingers in any part of the apparatus for any undue period of time.

Figure 7:
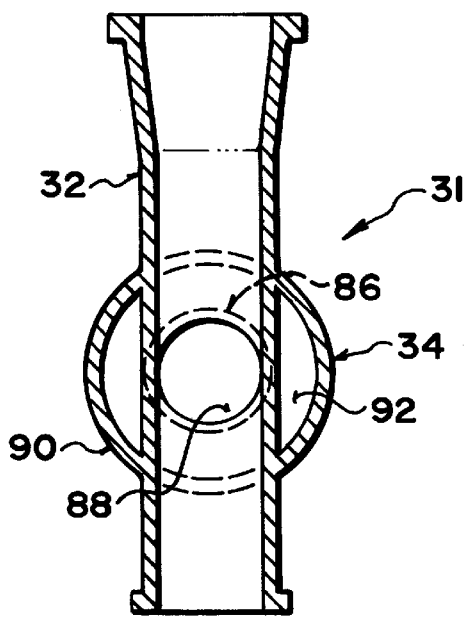
FIG. 7 is a sectional view showing a peripheral portion of the fruit chip dispensing apparatus and a single discharge nozzle.

FIG. 7 illustrates a cross-sectional view of the manifold 31. The manifold 31 comprises the top inlet tube 32 and the lateral manifold dispensing tube 34. The manifold tube 34 houses an inner tubular member 86 which defines a flow passageway 88 for the fluid fruit mixture. The inner tube 86 is surrounded by an outer tube 90 which together with the inner tube 86 defines an annular passageway 92 through which is directed hot water which transfers heat to keep the fluid fruit mixture in the passageway 88 at a desired temperature of about 195° F. (90° C.). In like manner, the other components of the dispensing apparatus 16 are similarly heated to maintain a temperature of 195° F. (90° C.).

The operation of the valve housing 38 will now be described in reference to FIGS. 8A, 8B and 8C. These three figures show schematically in sequential section view the operation of one of the valve spool elements 46. It can be seen that each valve element 46 has a through passageway 96 and a branch passageway 98. The valve housing 40 has a circular interior opening to accommodate the valve spool element 46.

Figure 8A:
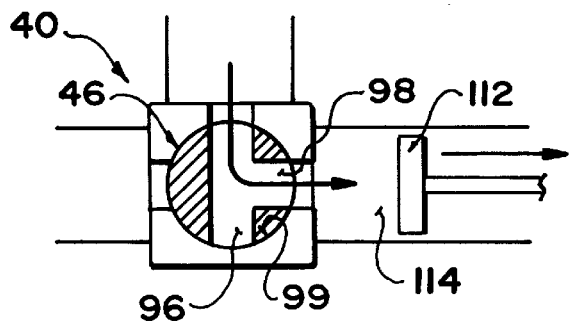
FIGS. 8A, 8B and 8C are semi-schematic sectional views of one of the dispensing valves in the valve assembly showing in sequence the mode of operation of the dispensing apparatus.

In the position of FIG. 8A, all four pistons 112 of the cylinder assemblies 102 (see also FIG. 3) are being retracted to move the hot viscous but fluid fruit mixture (which is directed into the manifold assembly 31 under moderate pressure) downwardly into the passageway 96 which is now in a blocked position. Each piston 112 has a stroke which is adjusted to draw in sufficient fluid fruit mixture to supply (on the discharge stroke of the piston 112) one set of discharge nozzles 78 with the proper amount of fruit material to form a number of fruit chip droplets 17 in its related one of the four square chamber segments 68 of the dispensing assembly 65.

Figure 8B:
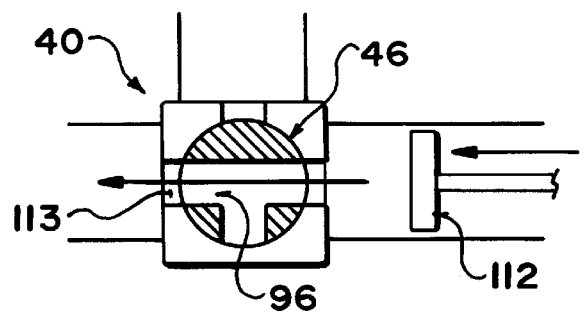

After the four pistons 112 have retracted the proper distance and drawn in the proper amount of fruit mixture, the valve elements 46 and part of valve element 42 are rotated 90° by drive piston 100 (see FIG. 3) to the position of FIG. 8B. As soon as this occurs, the four pistons 112 are moved toward their related valves 46 to discharge the proper amount of the fruit mixture outwardly at outlet 113 to flow through its related T member 52 (see FIG. 3) into one of the four square dispensing chambers 68. Then the fluid fruit material in each of the chambers 68 is moved downwardly through the dispensing nozzles 78 and onto the conveyor belt 18 (see FIG. 1).

Figure 8C:
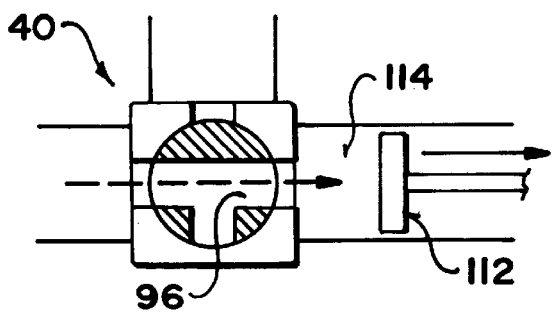

Reference is now made to FIG. 8C which illustrates an advantageous feature of this dispensing apparatus which promotes ease of operation and consistent fruit chip production. Just after the droplet of fruit material has been deposited through nozzles 78 onto the conveyor belt 18 in fruit chip-sized droplets, each of the four pistons 112 is retracted a short distance. The reason for this is that when the droplets 17 are discharged, there is left a string of the viscous fruit mixture material extending from the nozzle 78 down to the conveyor 18. By retracting the pistons 112 a short distance before the valve element 46 returns to the position shown in FIG. 8A, the fruit mixture that is adjacent to the discharge tube 80 is drawn a short distance back into the discharge nozzle 78. This action breaks off this viscous string. This slight piston withdrawal action permits the fruit chip droplet to form in the shape of a discrete droplet with a rounded upper surface without a "tail".

When this is accomplished, the valve elements 46 are moved back to the positions shown in FIG. 8A, and the pistons 112 are further retracted to draw in a further charge of new fluid fruit mixture into the cylinders 102 in which the pistons 112 reciprocate so that another discharge stroke can be performed.

Figure 9:
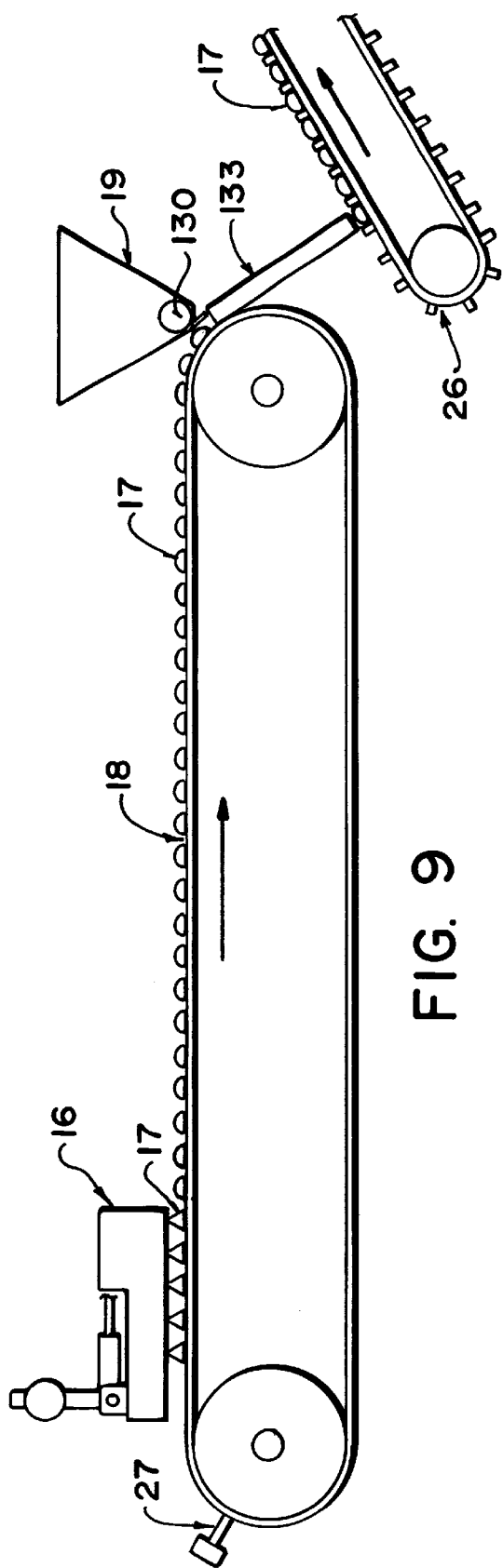
FIG. 9 illustrates an elevation view of the dispensing apparatus depositing fruit chips on an upstream end of a moving conveyor with a powdered sugar sprinkler located at the downstream end of the conveyor.

FIG. 9 illustrates an elevation view of the depositor 16 (the operation of which has been discussed above in association with FIGS. 3 to 8) depositing fruit droplets 17 onto the moving conveyor 18. The travelling surface of the moving conveyor 18 is constructed of thin flexible flat steel plate, which is maintained at ambient temperature. A scraper blade 27 located at the upstream end of the conveyor 18 scrapes away any unwanted debris from the surface of the travelling conveyor 18 so that there is no contamination of the deposited fruit chip 17. FIG. 9 also illustrates the powdered sugar sprinkler 19 with rotation sprinkler tube 130 (see also FIG. 12). The fruit chip 17, after being coated with powdered sugar by sprinkler 130, drops down chute 133 onto conveyor 26.

Figure 10:
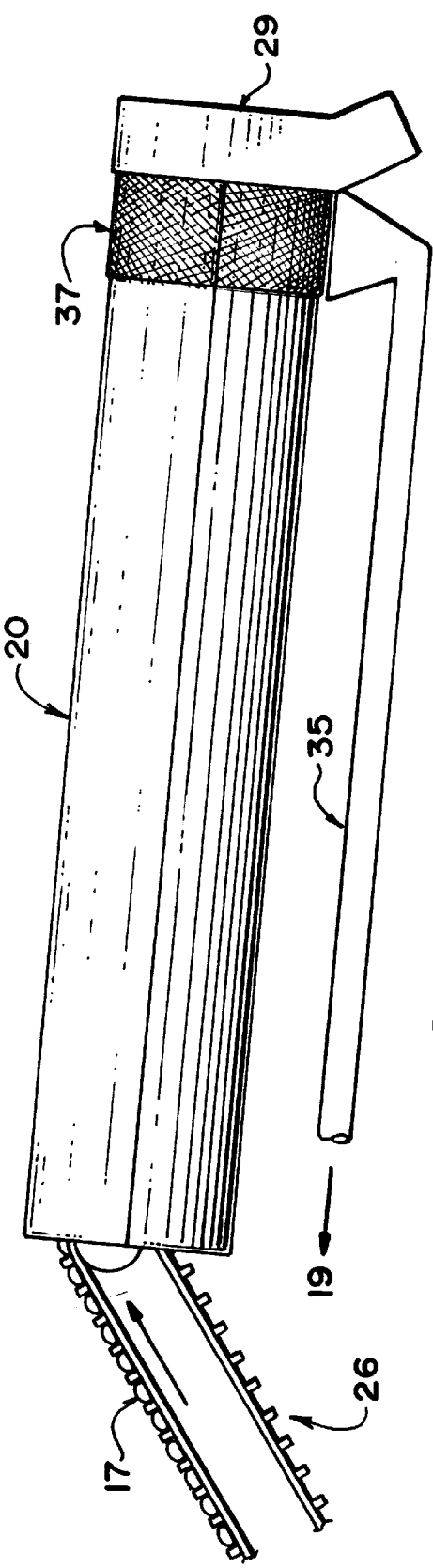
FIG. 10 illustrates an elevation view of the fruit chip tumbler.

FIG. 10 illustrates an elevation view of the tumbler 20. The deposited fruit chips 17 on conveyor 26 are introduced into the upstream end of the tumbler 20, which rotates at a relatively slow rate. The purpose of the tumbler 20 is to tumble the sugar coated fruit chips 17 so that the powdered sugar becomes embedded in the surface of the gelled fruit chips. The tumbling action of the tumbler 20 should not be particularly aggressive. Since the fruit chips 17 have not yet become totally dimensionally stable, aggressive tumbling action would damage the shape of the fruit chips 17, or cause them to impact and stick and collect together. On the other hand, the tumbling action of the tumbler should not be so mild that the function of embedding the powdered sugar into the surfaces of the fruit chips 17 is not achieved successfully. The angle of the tumbler 20, and the rate of rotation, are adjustable so that the fruit chips 17 have a specified residence time in the tumbler 20 travelling from the upstream to the downstream end. A fruit chip collecting chute 29 is located at the downstream end of the tumbler 20. A screen 37 at the end of the tumbler 20 enables excess sugar to be collected and returned by an enclosed auger to sugar sprinkler 19. Tumbler 20 also allows the fruit chips temperature to slowly drop to an ambient temperature and ensures that the pectin molecules are properly aligned to provide for enhanced water binding and increased gel strength.

Figure 11:
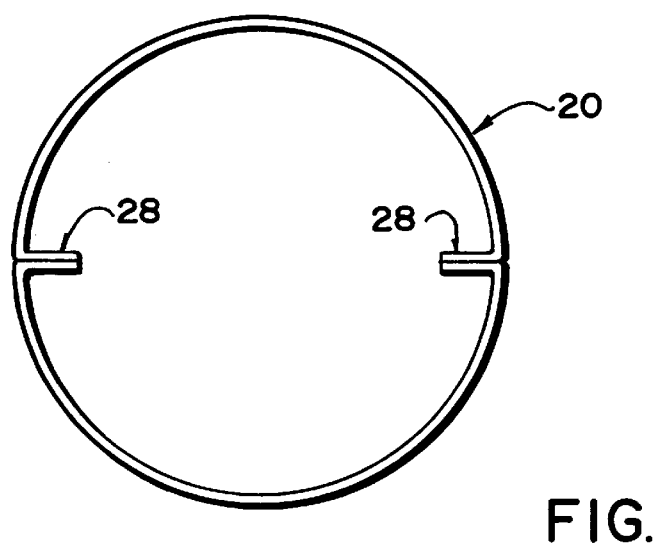
FIG. 11 illustrates a section view of the tumbler.

FIG. 11 illustrates a section view of the tumbler 20. The tumbler 20 is constructed of two semi-circular tubular sections, with the mating sections folded inwardly to form a pair of baffles 28. These baffles 28 promote tumbling of the fruit chips 17 as they travel down the length of the tumbler 20. It has been found that two baffles 28 are sufficient for proper tumbling action. More baffles might cause the fruit chips to impact too aggressively with one another. The baffles 28 are sufficiently wide that the fruit chips 17 tend to be carried up the side of the rotating tumbler 20 for a short period of time before falling off. This contributes to the tumbling action.

Figure 12:
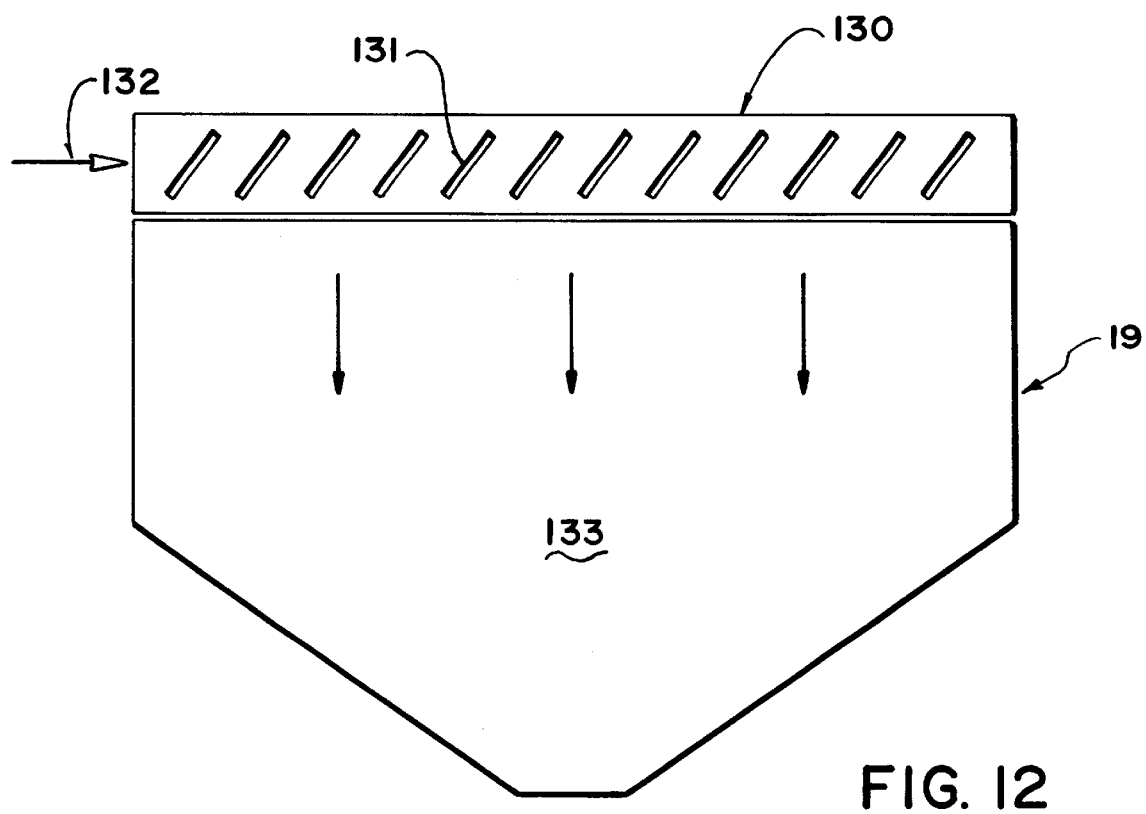
FIG. 12 illustrates an end elevation view of the powdered sugar sprinkler.

FIG. 12 illustrates an elevation view of the sugar sprinkler 19. The sugar sprinkler 19 is constructed of a hollow tube 130, which has a series of angled slots 131 located along the downstream side thereof. The tube 130 has an auger therein (not shown) which transports powdered sugar which is introduced at location 32 along the internal length of the tube 130. As the auger transports the powdered sugar along the length of the interior of the tube 130, the powdered sugar spills out in stages through the angled slots 131. The angles of the slots 131 are designed so that the combination of the angled slots 131 and the rotating auger inside the tube 130 ensure that the powdered sugar is spilled out through the angled slots 31 consistently across the width of the sugar-chip chute 133. The fruit chips 17 are distributed across the width of chute 133, so it is important that the powdered sugar also be distributed across the width of the chute 133.

FIG. 13 illustrates an elevation view of the cooling chamber or tunnel 22. The cooling chamber is constructed of a moving conveyor belt 136 housed inside an elongated housing or hood 134, which has a top cool air inlet 135 located approximately two-thirds along the length of the conveyor 136 and the hood 134. It has been determined that it is preferable to introduce the cool air at a mid-region of the cooling chamber 22. If the cool air is introduced at a downstream end of the conveyor 136 and hood 134, the cooling air absorbs heat from the warm fruit chips 17 and warms up as it travels upstream within the hood 134 to the upstream end of the conveyor 136 and hood 134. Similarly, if the cooling air is introduced at the upstream end of the hood 134 and conveyor 136, the cooling air warms up due to heat absorbed from the warm fruit chips as the cooling air passes in the hood 134 to the downstream end of the conveyor 136. Warming the cooling air defeats the purposes of the cooling air. Introducing the cooling air at a mid-point through cool air inlet 135 has been found to minimize the warming action imparted on the cool air by the warm fruit chips.

Figure 14:
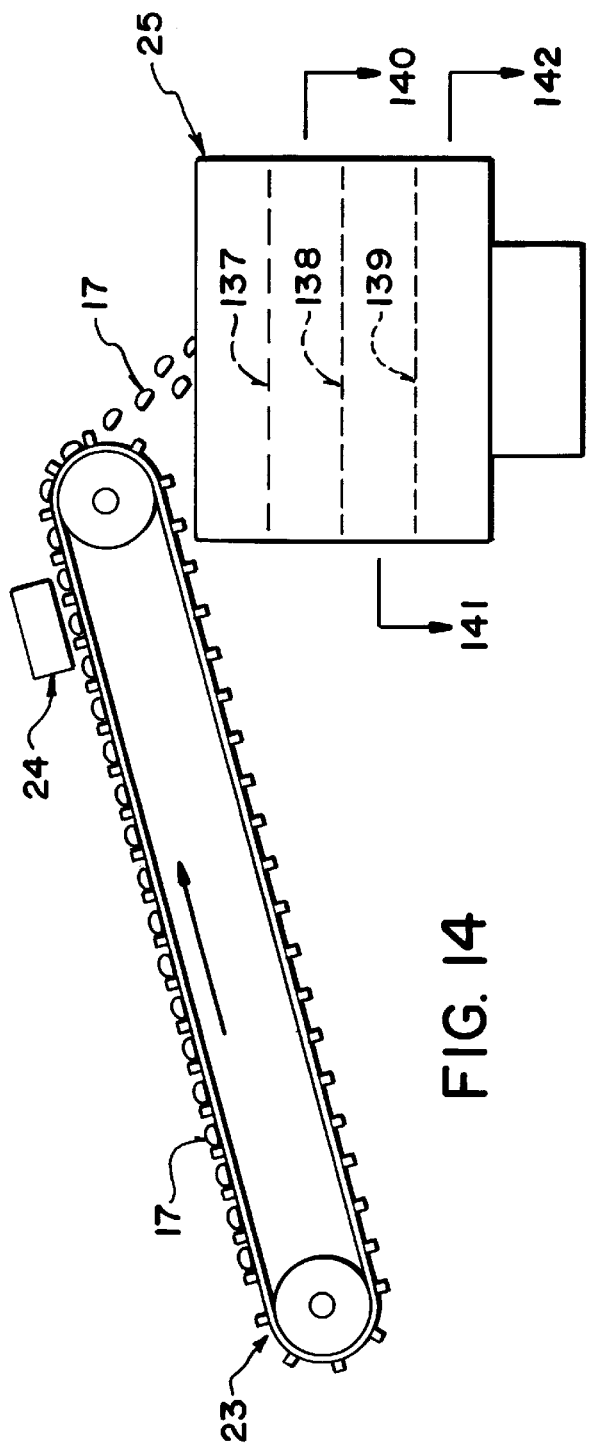
FIG. 14 illustrates an elevation view of the cooled fruit chip conveyor with metal detector and fruit chip classifier.

FIG. 14 illustrates an elevation view of the cooled sugar coated fruit chip conveyor 23, which carries the fruit chips 17 upwardly under metal detector 24 and then at the upstream end drops the sugar coated fruit chips 17 into the classifier 25. The classifier 25 vibrates and contains therein a stacked triple set of screens 137, 138 and 139. Top screen 137 has half inch spaces therein, middle screen 138 has $\frac{5}{16}$ inch spaces therein, while bottom screen 139 is 20 mesh, which means that the openings therein are approximately $\frac{1}{20}$ of an inch. The triple set of stacked screens 137, 138, 139, by vibrating, sort the sugar coated fruit chips 17 and ensure only fruit chips 17 of a size suitable and consistent for commercial use. The top screen 137 collects oversized fruit chips. It has been found that due to the excellent performance of the depositor 16, these are not particularly numerous and can be removed periodically by hand since they are collected on the top screen 137. The middle $\frac{5}{16}$ inch screen 138 captures the bulk of the fruit chips 17 and they are taken away via arrow 140 and packaged for commercial use. Any undersize fruit chips fall through screen 138 and are collected on screen 139 and are taken away via arrow 141. Any surplus sugar that falls away from the fruit chips 17, drops through the bottom screen 139 and is withdrawn via arrow 142.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of making a dry particulate natural fruit chip product comprising:
   (a) adding a fruit ingredient and water to a heated kettle;
   (b) adding buffer, sugar and pectin to the fruit ingredient and water;
   (c) boiling the buffer, sugar and pectin fruit ingredient and water mixture to hydrate the pectin;
   (d) adding liquid sugar to the mixture and continuing to boil the mixture until excess water is boiled away;
   (e) adding sugar to the mixture in the kettle to reduce the temperature of the mixture and increase solids concentration;
   (f) transporting the mixture from the kettle through a heat exchanger to raise the temperature of the mixture;
   (g) adding acid and flavoring mix to the mixture and mixing the acid/flavour into the mixture;
   (h) passing the mixture into a heated depositor and dispensing the mixture onto a surface in the form of discrete fruit chips;
   (i) retaining the fruit chips on the surface until they lose heat and form a stable gel;
   (j) transporting the gelled fruit chips through a zone to remove excess moisture and enhance gel strength of the fruit chips; and
   (k) transporting the fruit chips through a cooling zone so that the fruit chips lose further heat and reach ambient temperature.

2. The method as recited in claim I wherein the water content of the boiling mixture in step (d) is reduced giving about 72 percent weight solids.

3. The method as recited in claim 1 wherein the sugar added in step (c) raises the solids content of the mixture to about 82 to 88 percent weight solids.

4. The method as recited in claim 1 wherein the temperature of the mixture in step (c) is raised to about 105° to 106° C.

5. The method as recited in claim 1 wherein the temperature of the mixture in step (e) after the sugar is added is between about 160 to 170° F.

6. The method as recited in claim 1 wherein the temperature of the mixture in step (f) reaches about 195° to 200° C.

7. The method as recited in claim 1 wherein the temperature at the end of step (i) is about 120° F.

8. The method as recited in claim 1 wherein the mixture in step (h) is dispensed as droplets onto the surface.

9. The method as recited in claim 8 wherein the surface upon which the mixture is deposited in the form of discrete droplets is a moving conveyor belt.

10. The method as recited in claim 1 wherein the buffer in step (b) is sodium citrate.

11. The method as recited in claim 1 wherein the sugar is selected from one or more of the group consisting of sucrose, glucose, maltose and dextrose.

12. The method as recited in claim 1 wherein after the mixture is dispensed in the form of discrete droplets onto the surface according to step (h), the discrete droplets are conveyed through a zone in which the temperature of the discrete droplets is at a temperature of about 125° F.

13. The method as recited in claim 12 wherein the discrete droplets are conveyed through the zone for about 10 minutes.

14. The method as recited in claim 12 wherein the discrete droplets after passing through the zone are conveyed through a cooling zone in step (k) which is maintained at a temperature of about 40° F.

15. The method as recited in claim 14 wherein the discrete droplets are conveyed through the cooling zone for about 20 to 45 minutes.

16. The method as recited in claim 1 wherein the percentage by weight of ingredients in the fruit mixture are as follows:

| | |
|---|---|
| fruit | 20 to 40 percent; |
| sugar (sucrose) | 35 to 50 percent; |
| glucose | 20 to 30 percent; |
| pectin | 1.2 to 2.0 percent wt.; |
| sodium citrate | 0.3 to 0.8 percent wt.; |
| natural flavor | 0.2 to 1.0 percent wt. |

17. The method as recited in claim 1, wherein the fruit ingredient is selected from a group consisting of blueberries, blackberries, strawberries, raspberries, oranges, lemons, limes, cherries, mangos, peaches, apricots, passion fruit, cranberries, apples, black currants, papayas, grapes and combinations thereof.

18. The method as recited in claim 1, wherein said fruit ingredient is selected from a group consisting of fresh fruit, fruit puree, refrigerated fruit frozen fruit that has thawed, fruit concentrate, or dried fruit which has water added thereto to form said fruit ingredient, and combinations thereof.

19. The method as recited in claim 1, wherein said fruit ingredient is in a particulate, comminuted or concentrate form.

20. The method as recited in claim 1, wherein the buffer is added to the fruit ingredient prior to adding the pectin, in order to delay gelling of the pectin.

21. The method as recited in claim 1, wherein said pectin is provided as a mixture of pectin and particulate sugar.

22. The method as recited in claim 21, wherein said particulate sugar in step (e) is sucrose.

23. The method as recited in claim 22, wherein the ratio of sugar to pectin in the mixture of sucrose and pectin is between 2 to 1 and 6 to 1.

24. The method as recited in claim 1, wherein the liquid sugar in step (d) is glucose.

25. The method as recited in claim 1, wherein at least a portion of the liquid sugar is a lower molecular weight sugar so that the final product comprises both sucrose and the lower molecular weight sugar.

26. The method as recited in claim 25, wherein said lower molecular weight sugar comprises dextrose.

27. The method as recited in claim 1, wherein the percentage by weight of ingredients added in steps (a) and (d) are as follows:

| | |
|---|---|
| fruit ingredient | 20% to 40% |
| sugar | 40% to 75%. |

28. The method as recited in claim 1, wherein a portion of said sugar is sucrose and is added in a percentage range by weight of 35 to 50%, and a portion of the sugar is glucose which is added to any percentage by weight of 20 to 30% of the total ingredients.

29. The method as recited in claim 24, wherein pectin is added at a percentage of 1.2 percent to 2 percent of total weight of ingredients.

30. The method as recited in claim 1 wherein the surfaces of the fruit chips are treated to prevent the fruit chips from adhering together.

31. The method as recited in claim 30 wherein the surfaces of the fruit chips are treated with powdered sugar.

32. The method as recited in claim 1 wherein the fruit chips produced by steps (h) and (i) are coated with powdered sugar before proceeding to step (j).

33. A method as recited in claim 31 wherein the fruit chips are treated to embed the powdered sugar into the surfaces of the fruit chips.

34. A method as recited in claim 33 wherein the fruit chips are tumbled to cause the fruit chips to impact with one another and embed powdered sugar in the surfaces of the fruit chips.

* * * * *